Patented July 14, 1936

2,047,247

UNITED STATES PATENT OFFICE 2,047,247

POLYMERIZATION OF RESINS

George Kenneth Anderson, Pittsburgh, Pa., assignor to The Neville Company, a corporation of Pennsylvania No Drawing. Original application August 3, 1934, Serial No. 738,300. Divided and this application July 1, 1935, Serial No. 29,376. Renewed May 20, 1936

3 Claims. (Cl. 260—7)

This invention relates to the production of coumarone-indene resin, hereinafter termed, as in commerce, merely "coumarone" resin, by the catalytic polymerization of resin-forming bodies contained in crude solvent naphtha, and other hydrocarbon liquids, containing bodies polymerizable to form resins of the coumarone type.

In a catalytic polymerization process, such as a process by which coumarone resin is produced by the polymerization of resin-forming bodies in crude solvent naphtha, or its equivalent, sulphuric acid is the most satisfactory catalyst, and the catalyst most generally employed. Concentrated sulphuric acid, i. e. 66° Baumé sulphuric acid, is in some respects the ideal catalyst for use in such polymerizing process.

There are, however, certain problems attendant upon the use of concentrated sulphuric acid, and these problems have been solved more or less satisfactorily by various methods of procedure. It is well known that in the polymerizing reaction which produces coumarone resin, utilizing sulphuric acid as a catalyst, there is a tendency for the reaction temperature to rise rapidly in a surge, which produces a relatively great proportion of sludge, and which also tends to produce resin lacking in adequate solubility. Although the rapid rise of reaction temperature may be tempered in various ways, there is present during polymerization, a tendency toward intense local action in the reactive material, with attendant side reactions and the production of unduly high polymers, and undesirable products of reaction. This effect also results in degree, in the production of resins of inadequate solubility, and increases the difficulty of purification and recovery.

I have found that one satisfactory method of tempering the polymerizing action of sulphuric acid in the formation of resins, and of controlling the reaction by which polymerization proceeds in the polymerizable content of crude solvent naphtha, and the like, is to dilute concentrated sulphuric acid, employed as a catalyst, by means of a suitable organic solvent diluent.

For use as a diluent for sulphuric acid in, for example, the production of coumarone resin by polymerization, it is essential that the diluent be a solvent for the sulphuric acid, and that it should neither react with the inert constituents of the reaction mixture, nor produce of itself side reactions in the bodies available for polymerization. It is also necessary that the diluent should either be non-reactive with the sulphuric acid, or that such reaction as may occur does not substantially impair the activity of the sulphuric acid as a catalyst.

I have found that isopropyl ether is a desirable diluent. This material conforms to the requirements which have been explained above. The subject-matter herein disclosed and claimed is divisional of that disclosed in co-pending application Serial No. 738,300, filed August 3, 1934.

In some respects the results obtained from the use of isopropyl ether as a diluent for the sulphuric acid differ from the results obtained by the use of acetic acid as the diluent. It has been my experience that under identical conditions a dilute catalyst, in which isopropyl ether is the diluent, tends to produce a coumarone resin having a higher melting point than that produced by a catalyst comprising sulphuric acid in a state of dilution in acetic acid, or its homologue.

An example of a polymerization process using isopropyl ether as a diluent for sulphuric acid may be cited as follows:

Example No. 1

Taking crude solvent naphtha containing 50% of polymerizable bodies, I added to it a catalyst comprising 66° Baumé sulphuric acid and isopropyl ether, in the proportion of 1 part by volume of the sulphuric acid to 4 volumes of ether. The initial temperature of the crude solvent naphtha was 17° C. and the catalyst was added in bulk. During a reaction period of 8 minutes the temperature rose to a maximum of 28° C. The proportion of sulphuric acid considered alone to the total volume of crude solvent naphtha was 1%. I found the melting point of the resin recovered from this polymerizing reaction to be 121° C. and that the resin precipitates from Stoddard solvent naphtha at 7° C. The color of the resin was dark amber.

Example No. 2

As another typical example as a use of isopropyl ether as a diluent, I conducted polymerization in which the same proportion of sulphuric acid to isopropyl ether was used, and in which I used the same proportion of sulphuric acid to crude solvent naphtha. The crude solvent naphtha constituting the reaction material, however, contained 67.2% of polymerizable bodies. The initial temperature of the reactive material was 17° C., and the maximum reaction temperature was below 42° C. The reaction proceeded to completion more slowly than in the next preceding example, and I allowed the catalyst to remain in contact with the crude solvent naphtha for a period of 1½ hours.

I have made no melting point test upon the resin produced, but observed that the resin cracked readily at normal room temperature, indicating roughly a melting point higher than about 90° C. The resin showed precipitation from Stoddard solvent naphtha at —9° C.

It is apparent from the above examples that the isopropyl ether, also, did not so react with the sulphuric acid as seriously to impair the catalytic value of the catalytic solution.

In both the runs utilizing isopropyl ether as a solvent diluent for the sulphuric acid, the reacted mixture was diluted with three times its volume of petroleum benzine in preparation for washing and neutralization.

In the examples given the reaction temperature was controlled by water jacketing. I have noted particularly that the control of reaction temperature may be readily effected when using isopropyl ether as a catalyst. In each of the examples given water at tap temperature was used instead of the refrigerated water commonly employed to control the temperature of a polymerizing reaction to produce resin.

In each example given, the period of reaction was relatively extended. There was no apparent substantial production of unduly high polymers, and there appeared to be no products of side reactions.

It may be explained that in testing the solubility of the resin by precipitation from Stoddard solvent naphtha, I made in each instance a 20% solution by weight of the resin in the solvent, and cooled back to the temperature at which precipitation took place.

I claim as my invention:

1. In the process of producing resin by the catalytic polymerization of crude solvent naphtha or a like reaction liquid containing bodies polymerizable to coumarone resin, the herein described polymerization step which comprises preparing a catalytic solution by diluting sulphuric acid with isopropyl ether, and commingling the resulting catalytic solution with the body of reaction liquid, thereby effecting in the reactive liquid a polymerizing reaction produced by the catalytic solution.

2. The herein described polymerization step in accordance with the procedure of claim 1 in which the isopropyl ether is in a volume substantially in excess of the volume of sulphuric acid.

3. The herein described polymerization step in accordance with the procedure of claim 1 in which the isopropyl ether is in a volume equal approximately to four times the volume of the sulphuric acid.

GEORGE KENNETH ANDERSON.